Sept. 6, 1949.　　　　　F. NEALE　　　　　2,481,144
BRAKE AND CLUTCH OPERATING MECHANISM
Filed June 19, 1945　　　　　　　　　　　　　3 Sheets-Sheet 1

Sept. 6, 1949.  F. NEALE  2,481,144
BRAKE AND CLUTCH OPERATING MECHANISM
Filed June 19, 1945  3 Sheets-Sheet 2

Inventor:
Fred Neale
by Babcock & Babcock
Attorneys

Sept. 6, 1949.　　　　　　F. NEALE　　　　　　2,481,144
BRAKE AND CLUTCH OPERATING MECHANISM
Filed June 19, 1945　　　　　　　　　　　3 Sheets-Sheet 3

Inventor.
Fred Neale
by Babcock & Babcock
Attorney

Patented Sept. 6, 1949

2,481,144

UNITED STATES PATENT OFFICE 2,481,144

BRAKE AND CLUTCH OPERATING MECHANISM

Fred Neale, Coventry, England

Application June 19, 1945, Serial No. 600,282
In Great Britain July 6, 1944

3 Claims. (Cl. 188—78)

This invention relates to shoe operating mechanism for brakes of the kind in which the shoes are carried by a carrier and adapted to be moved into and out of engagement with a rotatable member by mechanical means.

The object of the invention is to provide for the mechanical actuation of the shoes in such a manner that they are presented to the drum under substantially equal pressures.

A further object of the invention is to provide means whereby shoes operated as above described may be operated also by alternative or additional means, such as by fluid pressure.

According to this invention elements of a device actuated by hydraulic or compressed air means to operate brake shoes are adapted to be actuated also by a mechanically operated device having linear movement only in the direction or directions of movements of said elements.

Such mechanical means avoid the possibility of presenting shoes to their drum under unequal pressures due to unequally worn shoes under fluid pressure operation or that of presenting one shoe only to its drum under similar circumstances due to undue wear of the other shoe.

Figure 1:
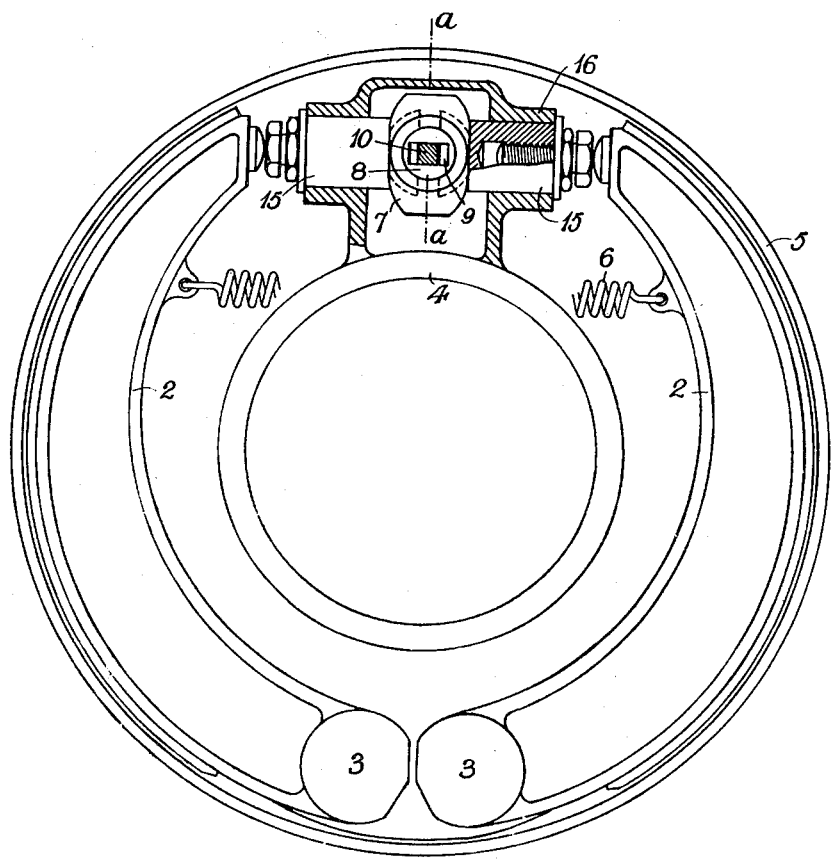
Figure 1 shows a brake of the kind herein referred to having brake shoe operating mechanism embodying this invention.

Referring to the drawings 2, 2 represents a pair of brake shoes pivoted at 3, 3 to a brake shoe carrier 4 and adapted to be moved into engagement with a rotatable brake drum 5, against the action of retraction springs 6, 6.

In the arrangement shown the means employed for the mechanical actuation of the brake shoes so that they exert substantially equal pressures against the brake drum, consists of a cam 7 which is rotatably mounted on a bushing 8 having a rectangular hole 9 co-operating with a square shaft 10 carried without rotation therewith by the brake shoe carrier. The cam is rotated on the bushing through an Oldham coupling 11 by means of a shaft 12 which is rotatable in a bearing 13 formed in the brake shoe carrier and adapted for operation by means of a lever 14.

Figure 2:
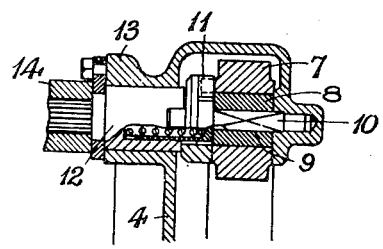
Figure 2 is a sectional detail view on the line a—a of Figure 1.

In the specific example shown in Figures 1 and 2, the cam 7 operates the brake shoes by means of plungers 15, 15 slidably mounted in a housing 16 on the brake shoe carrier 4. The arrangement is such that as the cam is rotated to apply the brake shoes 2, 2 to the drum 5 the bushing 8 carrying it is free to move on the square shaft 10 in a direction such that the reaction of pressure exerted by one of the shoes on the drum is provided by the pressure of the other shoe on the drum thereby equalising the pressures exerted by the two shoes.

Figure 3:
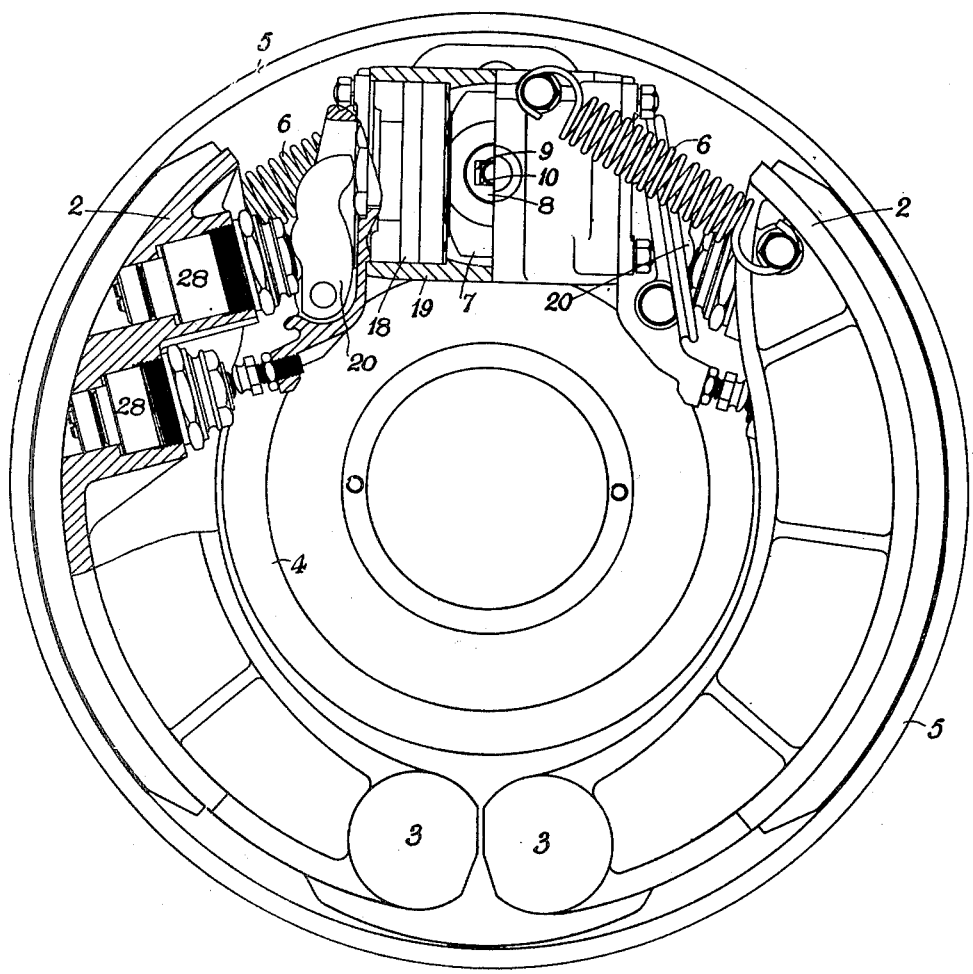
Figure 3 is a view similar to Figure 1 illustrating brake mechanism embodying the present invention and adapted for operation also by fluid pressure.
Figure 4:
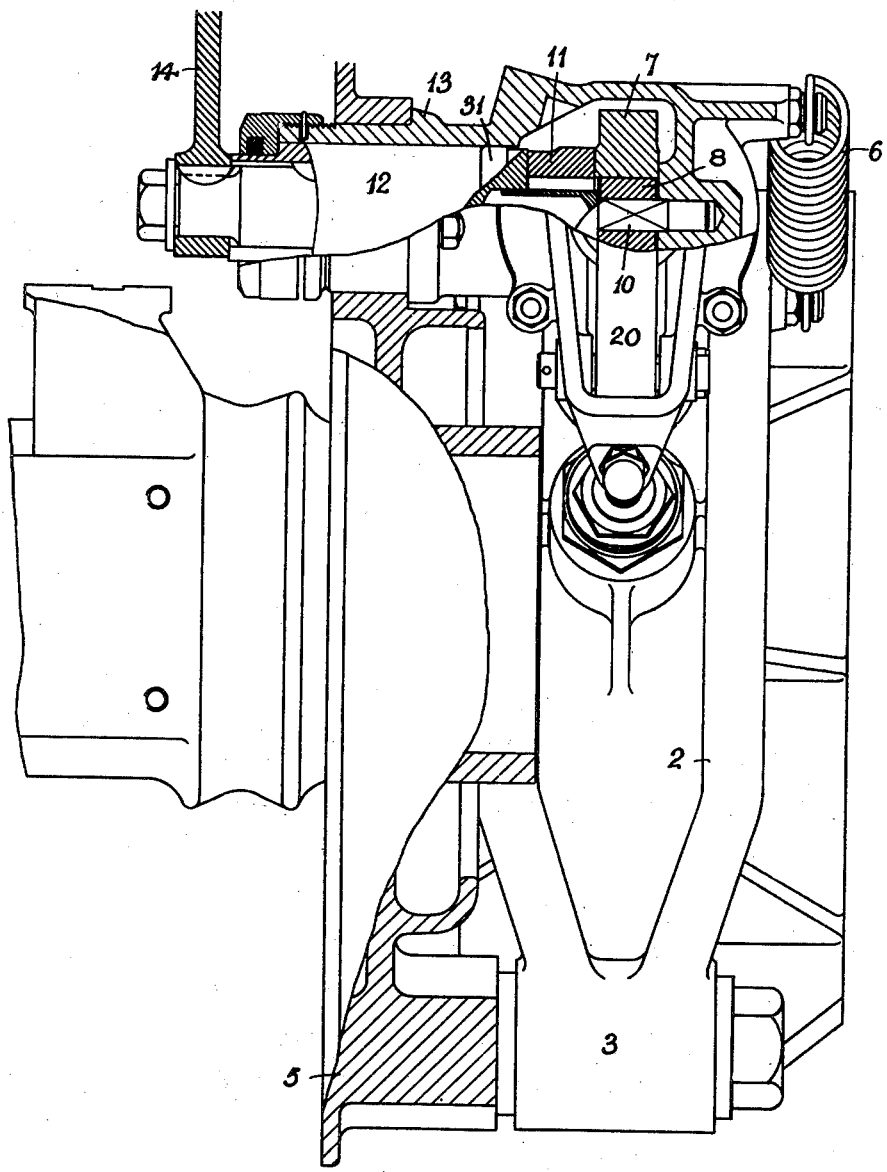
Figure 4 is a view partly in section and taken at right angles to Figure 3.

In cases where according to this invention it is desired that fluid pressure means of operating the shoes be provided in addition to the mechanical means herein described, the arrangement shown in Figures 3 and 4 may be adopted in which pistons 18 slidably mounted and having suitable sealing means in a cylinder or housing 19 fast with the brake shoe carrier 4 are adapted to be moved therein by fluid pressure admitted to said housing between them and by means of a cam 7 rotatably mounted on a bushing 8 having a rectangular hole 9 co-operating with a square shaft 10 carried without rotation therewith by the housing 19. The cam is rotated on the bushing through an Oldham coupling 11 by means of a shaft 12 which is rotatable in a bearing 13 formed in the housing and carries sealing means 31 to prevent egress of fluid between the said shaft and bearing, said shaft being adapted for operation by means of a lever 14. The pistons may operate on the brake shoes 2, 2 either directly or indirectly, such as by means of intermediate levers 20, as shown.

I claim:

1. In a brake having swingably mounted brake shoes disposed for movement in opposite directions into operative engagement with a brake drum, mechanical brake operating mechanism comprising in combination, an operating shaft mounted on said brake for rotary movement, a cam located between said brake shoe operating members and adapted on rotation to move apart said members, an Oldham coupling connecting said shaft to said cam, a nonrotatable bushing on which said cam is rotatably mounted, said bushing being formed with a rectangular hole therethrough, and a fixed squared projection disposed in said hole to slidably non-rotatably support said bushing to permit limited movement of said bushing in the direction of movement of either of said brake shoe operating members.

2. In a brake having swingably mounted brake shoes disposed for movement in opposite directions into operative engagement with a brake drum, mechanical brake operating mechanism comprising in combination, a rotary operating shaft, a cam located between said brake shoe operating members and adapted on rotation to move apart said brake shoe operating members, an Oldham coupling connecting said shaft and said cam for rotary movement together, a non-rotatable bushing on which said cam is rotatably mounted, and a fixed member on which said bushing is slidably mounted for movement between said brake shoe operating members.

3. In a brake having swingably mounted brake shoes disposed for movement in opposite directions into operative engagement with a brake drum, mechanical brake operating mechanism comprising a house, a pair of relatively aligned plungers slidably mounted in said housing for movement with said respective brake shoes, a fixed member mounted in said housing between said plungers and having opposed flat surfaces disposed parallel to the direction of movement of said plungers, a bushing slidably mounted on said fixed member for movement in alignment with said plungers, said bushing having an opening therein slidably receiving said fixed member, said opening being partially defined by opposed flat surfaces in sliding engagement with the respective flat surfaces of said member, the exterior surface of said bushing being cylindrical, a cam rotatably mounted on said bushing in operative engagement with both of said plungers and operative to simultaneously spread same apart during rotary movement, in combination with a rotary actuating shaft mounted in said housing, and an Oldham coupling operatively connecting said shaft to said cam to cause rotary movement thereof despite relative misalignment between the rotational axes of said shaft and said cam respectively.

FRED NEALE.

REFERENCES CITED

The following references are of record in the file of this patent:

UNITED STATES PATENTS

| Number | Name | Date |
|---|---|---|
| 1,812,551 | Poulet | June 30, 1931 |
| 1,980,512 | White | Nov. 13, 1934 |
| 2,140,741 | Goepfrich | Dec. 20, 1938 |